US011059378B2

(12) United States Patent
Jaugilas

(10) Patent No.: US 11,059,378 B2
(45) Date of Patent: Jul. 13, 2021

(54) CHARGING A RECHARGEABLE BATTERY OF AN UNMANNED AERIAL VEHICLE IN FLIGHT USING A HIGH VOLTAGE POWER LINE

(71) Applicant: The Boeing Company, Chicago, IL (US)

(72) Inventor: John M. Jaugilas, Englewood, CO (US)

(73) Assignee: The Boeing Company, Chicago, IL (US)

( * ) Notice: Subject to any disclaimer, the term of this patent is extended or adjusted under 35 U.S.C. 154(b) by 472 days.

(21) Appl. No.: 15/815,689

(22) Filed: Nov. 16, 2017

(65) Prior Publication Data

US 2019/0143827 A1 May 16, 2019

(51) Int. Cl.

| | |
|---|---|
| ***H02J 7/00*** | (2006.01) |
| ***H02J 7/14*** | (2006.01) |
| ***B60L 53/36*** | (2019.01) |
| ***G08G 5/00*** | (2006.01) |
| ***B64C 39/02*** | (2006.01) |
| ***G05D 1/10*** | (2006.01) |
| ***B60L 53/12*** | (2019.01) |
| ***B60L 53/00*** | (2019.01) |

(52) U.S. Cl.

CPC ............... *B60L 53/36* (2019.02); *B60L 53/00* (2019.02); *B60L 53/12* (2019.02); *B64C 39/024* (2013.01); *G05D 1/101* (2013.01); *G08G 5/0021* (2013.01); *G08G 5/0034* (2013.01); *G08G 5/0069* (2013.01); *G08G 5/0086* (2013.01); *G08G 5/0091* (2013.01); *B64C 2201/042* (2013.01); *B64C 2201/066* (2013.01); *B64C 2201/146* (2013.01)

(58) Field of Classification Search

USPC .......................................................... 320/109

See application file for complete search history.

(56) References Cited

U.S. PATENT DOCUMENTS

| | | | | |
|---|---|---|---|---|
| 4,737,788 | A | 4/1988 | Kennedy | |
| 7,318,564 | B1 | 1/2008 | Marshall | |
| 7,398,946 | B1 | 7/2008 | Marshall | |
| 7,543,780 | B1 | 6/2009 | Marshall et al. | |
| 7,714,536 | B1 * | 5/2010 | Silberg | B64C 39/024 320/108 |
| 8,082,102 | B2 | 12/2011 | Ravenscroft | |

(Continued)

FOREIGN PATENT DOCUMENTS

WO WO2016103264 A1 6/2016

OTHER PUBLICATIONS

Lu, Maxim; James, Alex; Baheri, Mehdi; Unmanned Aerial Vehicle (UAV) Charging from Powerlines, Nov. 8, 2017; 2017 IEEE PES Asia-Pacific Power and Energy Engineering Conference (APPEEC). (Year: 2017).*

(Continued)

*Primary Examiner* — Alexis B Pacheco

(74) *Attorney, Agent, or Firm* — Yee & Associates, P.C.

(57) ABSTRACT

Methods are presented. A rechargeable battery of an unmanned aerial vehicle is charged using an electromagnetic field of a high voltage power line and a recharging system of the unmanned aerial vehicle. The unmanned aerial vehicle is flown a specified distance from the high voltage power line during the charging.

23 Claims, 7 Drawing Sheets

(56) References Cited

U.S. PATENT DOCUMENTS

| | | | | |
|---|---|---|---|---|
| 9,162,753 | B1 | 10/2015 | Panto et al. | |
| 9,376,208 | B1 | 6/2016 | Gentry | |
| 9,421,869 | B1 | 8/2016 | Ananthanarayanan et al. | |
| 2006/0091310 | A1 | 5/2006 | Furry | |
| 2010/0268409 | A1 | 10/2010 | Vian et al. | |
| 2011/0313652 | A1 | 12/2011 | Hancock | |
| 2015/0226559 | A1 | 8/2015 | Waite et al. | |
| 2015/0377405 | A1 | 12/2015 | Down et al. | |
| 2016/0169855 | A1 | 6/2016 | Baity | |
| 2016/0214714 | A1* | 7/2016 | Sekelsky | B64C 39/024 |
| 2016/0214715 | A1 | 7/2016 | Meffert | |
| 2016/0307447 | A1 | 10/2016 | Johnson et al. | |
| 2016/0364989 | A1 | 12/2016 | Speasl et al. | |
| 2017/0015414 | A1* | 1/2017 | Chan | H02G 1/02 |
| 2017/0097435 | A1 | 4/2017 | Hull et al. | |
| 2017/0174090 | A1* | 6/2017 | Lakamp | H02J 7/35 |
| 2017/0271926 | A1* | 9/2017 | Plekhanov | H01Q 21/20 |
| 2018/0166920 | A1* | 6/2018 | Britz | H02J 50/12 |
| 2018/0201370 | A1* | 7/2018 | Yang | B64C 39/024 |

OTHER PUBLICATIONS

The Netherlands Patent Office Written Opinion, Search Report, and English translation, dated Aug. 2, 2018, regarding Application No. NL2020097, 10 pages.

European Patent Office Communication and Search Report, dated Apr. 11, 2019, regarding Application No. 18206715.7, 13 pages.

European Patent Office Communication, dated Aug. 9, 2019, regarding Application No. 18206715.7, 12 pages.

Office Action, dated Jun. 26, 2020, regarding Application No. 16/193,178, 36 pages.

European Patent Office Communication, dated Jul. 17, 2020, regarding Application No. 18206715.7, 5 pages.

* cited by examiner

CHARGING A RECHARGEABLE BATTERY OF AN UNMANNED AERIAL VEHICLE IN FLIGHT USING A HIGH VOLTAGE POWER LINE

BACKGROUND INFORMATION

1. Field

The present disclosure relates generally to flying an unmanned aerial vehicle and, more specifically, to charging a rechargeable battery of an unmanned aerial vehicle in-flight. Yet more specifically, the present disclosure relates to charging a rechargeable battery of an unmanned aerial vehicle using a high voltage power line while the unmanned aerial vehicle is in-flight.

2. Background

Batteries are used to power unmanned aerial vehicles. Flight times and flight distances for unmanned aerial vehicles are affected by battery life. Increasing battery capacity increases available power, but also increases the weight of the unmanned aerial vehicle.

Therefore, it would be desirable to have a method and apparatus that take into account at least some of the issues discussed above, as well as other possible issues.

SUMMARY

An illustrative embodiment of the present disclosure provides a method. A rechargeable battery of an unmanned aerial vehicle is charged using an electromagnetic field of a high voltage power line and a recharging system of the unmanned aerial vehicle. The unmanned aerial vehicle is flown a specified distance from the high voltage power line during the charging.

Another illustrative embodiment of the present disclosure provides a method. A route of a high voltage power line through a region is identified. A flight plan for an unmanned aerial vehicle is created such that the unmanned aerial vehicle charges a rechargeable battery of the unmanned aerial vehicle using an electromagnetic field of the high voltage power line for at least a portion of the flight plan.

A further illustrative embodiment of the present disclosure provides a method. An unmanned aerial vehicle is positioned within an electromagnetic field of a high voltage power line. Energy is generated with an inductor attached to the unmanned aerial vehicle. The energy generated by the inductor is directed to a rechargeable battery of the unmanned aerial vehicle.

A yet further illustrative embodiment of the present disclosure provides an unmanned aerial vehicle. The unmanned aerial vehicle comprises a rechargeable battery, an inductor electrically connected to the rechargeable battery, and an impact prevention sensor.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
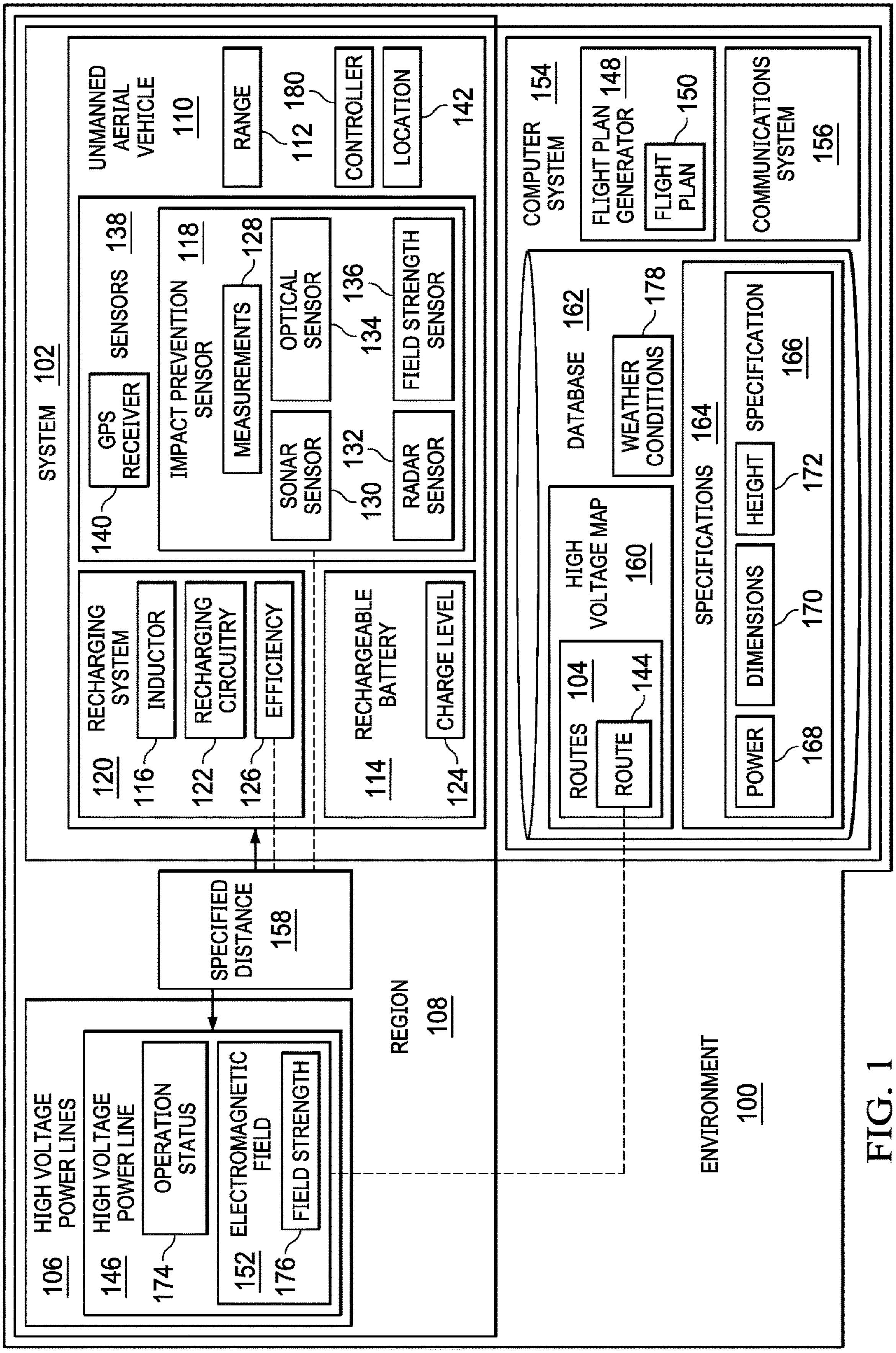
FIG. 1 is an illustration of a block diagram of an environment in which an aerial vehicle flies using a flight plan taking into account a route of a high voltage power line in accordance with an illustrative embodiment.

The illustrative embodiments recognize and take into account one or more different considerations. For example, the illustrative embodiments recognize and take into account that unmanned aerial vehicles are advantageous in several scenarios. The illustrative embodiments recognize and take into account that unmanned aerial vehicles can be used for delivery of packages by a store or vendor. The illustrative embodiments recognize and take into account that unmanned aerial vehicles can be used for delivery of fast food orders. The illustrative embodiments recognize and take into account that unmanned aerial vehicles can be used for transport of human or animal passengers. The illustrative embodiments recognize and take into account that unmanned aerial vehicles can be used for inspection and monitoring of utilities such as pipelines. The illustrative embodiments recognize and take into account that unmanned aerial vehicles can be used for surveillance and/or reconnaissance.

The illustrative embodiments recognize and take into account that unmanned aerial vehicles are often powered with electric motors. The illustrative embodiments recognize and take into account that unmanned aerial vehicles with electric motors also have rechargeable batteries.

The illustrative embodiments recognize and take into account that charging during flight may reduce charging time on the ground. The illustrative embodiments recognize and take into account that reducing charging time on the ground increases the time an unmanned aerial vehicle may be in flight. The illustrative embodiments further recognize and take into account that charging during flight may result in increasing a range of an unmanned aerial vehicle. Increasing the range of an unmanned aerial vehicle may increase at least one of the number of areas that may be serviced by the unmanned aerial vehicle, or the time an unmanned aerial vehicle may be used.

The illustrative embodiments recognize and take into account that high voltage power lines emit an Electro Magnetic Field (EMF). The illustrative embodiments further recognize and take into account that for high voltage power lines, the EMF is so strong that flying some types of model aircraft near high voltage lines is prohibited. The illustrative embodiments recognize and take into account that passing an inductor, such as a coil or a wire, through an EMF generates electrical voltage and current.

The illustrative embodiments recognize and take into account that because general and commercial aviation flights keep away from power lines, recharging using high voltage power lines avoids flying in airspace normally used by airplanes and ultralight vehicles.

The illustrative embodiments recognize and take into account that unmanned aerial vehicles (UAVs) may fly along utility lines to check for damage or sabotage. The illustrative embodiments recognize and take into account that often underground utilities or pipelines to be monitored are buried in the same easements as high voltage powerlines. The illustrative embodiments recognize and take into account that high voltage powerlines may either be buried within the same easement as or run above ground along the same path as other utilities.

An illustrative embodiment of the present disclosure provides a method. A rechargeable battery of an unmanned aerial vehicle is charged using an electromagnetic field of a high voltage power line and a recharging system of the unmanned aerial vehicle. The unmanned aerial vehicle is flown a specified distance from the high voltage power line during the charging.

Referring now to the figures and, in particular, with reference to FIG. 1, an illustration of a block diagram of an environment in which an aerial vehicle flies using a flight plan taking into account a route of a high voltage power line is depicted in accordance with an illustrative embodiment. Environment 100 contains system 102 for taking into account routes 104 of high voltage power lines 106 in region 108 when flying unmanned aerial vehicle 110 in region 108.

In some illustrative examples, system 102 increases range 112 of unmanned aerial vehicle 110. In these illustrative examples, system 102 takes into account routes 104 of high voltage power lines 106 to charge rechargeable battery 114 and increase range 112.

Unmanned aerial vehicle 110 comprises rechargeable battery 114, inductor 116 electrically connected to rechargeable battery 114, and impact prevention sensor 118.

Inductor 116 is part of recharging system 120 configured to recharge rechargeable battery 114. Recharging circuitry 122 of recharging system 120 electrically connects inductor 116 to rechargeable battery 114. Recharging circuitry 122 controls charging of rechargeable battery 114. In some illustrative examples, recharging circuitry 122 monitors charge level 124 of rechargeable battery 114. In some illustrative examples, recharging circuitry 122 controls charging of rechargeable battery 114 based on efficiency 126 of recharging.

Impact prevention sensor 118 monitors region 108 near unmanned aerial vehicle 110. Unmanned aerial vehicle 110 takes into account measurements 128 from impact prevention sensor 118, preventing unmanned aerial vehicle 110 from impacting objects, such as high voltage power lines 106. Unmanned aerial vehicle 110 may change at least one of altitude, flight direction, or speed to avoid obstacles based on measurements 128.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

Impact prevention sensor 118 takes any desirable form. In some illustrative examples, impact prevention sensor 118 is one of SONAR sensor 130, RADAR sensor 132, optical sensor 134, or field strength sensor 136.

In some illustrative examples, impact prevention sensor 118 is one of sensors 138. Sensors 138 include any other desirable type of sensors. As depicted, sensors 138 includes GPS receiver 140. GPS receiver 140 is used to determine location 142 of unmanned aerial vehicle 110 within region 108.

System 102 uses high voltage power lines 106 of region 108 to charge rechargeable battery 114 of unmanned aerial vehicle 110. Unmanned aerial vehicle 110 recharges rechargeable battery 114 while in flight.

System 102 identifies route 144 of high voltage power line 146 through region 108. High voltage power line 146 is one of high voltage power lines 106 in region 108. Flight plan generator 148 creates flight plan 150 for unmanned aerial vehicle 110 such that unmanned aerial vehicle 110 charges rechargeable battery 114 of unmanned aerial vehicle 110 using electromagnetic field 152 of high voltage power line 146 for at least a portion of flight plan 150. Flight plan 150 also meets any objectives or destinations for unmanned aerial vehicle 110.

Computer system 154 communicates flight plan 150 to unmanned aerial vehicle 110 using communications system 156. Unmanned aerial vehicle 110 is flown according to flight plan 150 while maintaining unmanned aerial vehicle 110 at least specified distance 158 from high voltage power line 146 using measurements 128 from impact prevention sensor 118 of unmanned aerial vehicle 110. Unmanned aerial vehicle 110 is flown specified distance 158 from high voltage power line 146 during the charging. In some illustrative examples, flight plan 150 includes portions that do not charge rechargeable battery 114. In these "non-charging" portions, unmanned aerial vehicle 110 is flown greater than specified distance 158 from high voltage power line 146.

Specified distance 158 is a desired distance that unmanned aerial vehicle 110 will be flown from high voltage power lines 106 during charging. By flying unmanned aerial vehicle 110 specified distance 158 from high voltage power line 146, range 112 of unmanned aerial vehicle 110 is increased over a range from a single charge of rechargeable battery 114. As used herein, flying unmanned aerial vehicle 110 is performed when unmanned aerial vehicle 110 is airborne. Flying unmanned aerial vehicle 110 may include any of takeoffs, landings, hovering, changes in altitude, or movements in latitude or longitude.

Unmanned aerial vehicle 110 is maintained at least specified distance 158 from high voltage power line 146 using controller 180 and impact prevention sensor 118. Impact prevention sensor 118 provides measurements 128 from which the actual distance between high voltage power line 146 and unmanned aerial vehicle 110 is determined. In some illustrative examples, aerial vehicle 110 will maintain an approximately constant distance from high voltage power line 146. In other illustrative examples, aerial vehicle 110 will maintain an approximately constant altitude such that aerial vehicle 110.

Specified distance 158 has any desirable value. In some illustrative examples, specified distance 158 is up to 200 meters. Specified distance 158 may be increased or decreased based upon specification 166 for high voltage power line 146. Specified distance 158 may be increased or decreased based on field strength 176 of electromagnetic field 152. In some illustrative examples, specified distance 158 is in the range of ten centimeters to 100 meters. In some illustrative examples, specified distance 158 is in the range of one meter to 50 meters.

Route 144 of high voltage power line 146 in region 108 is depicted in high voltage map 160. High voltage map 160 is present in database 162 of computer system 154. To create flight plan 150, flight plan generator 148 uses high voltage map 160.

In some illustrative examples, additional information regarding high voltage power lines 106 is stored in database 162. Specifications 164 for high voltage power lines 106 are optionally stored in database 162. Specifications 164 include any desirable characteristics of high voltage power lines 106.

As depicted, specification 166 of high voltage power line 146 includes power 168, dimensions 170, and height 172. Power 168 includes amperage or any other measurements for high voltage power line 146. Dimensions 170 include dimensions of the wires, platforms, and towers. Height 172 includes whether high voltage power line 146 is above ground or below ground and a distance high voltage power line 146 is above or below ground.

In some illustrative examples, unmanned aerial vehicle 110 is used to determine operation status 174 of high voltage power line 146. In some illustrative examples, field strength 176 of electromagnetic field 152 of high voltage power line 146 is detected with unmanned aerial vehicle 110 in-flight. In some illustrative examples, field strength 176 of electromagnetic field 152 is determined using field strength sensor 136. Operation status 174 of high voltage power line 146 is determined using field strength 176.

In some illustrative examples, to determine operation status 174, specification 166 of high voltage power line 146 is taken into account. A field strength, such as field strength 176, measured by field strength sensor 136, is dependent on at least one of specified distance 158, power 168 of high voltage power line 146, or other characteristics.

Unmanned aerial vehicle 110 flies relative to high voltage power line 146 using flight plan 150. Flight plan 150 may take into account any desirable properties such as weather conditions 178, a type of unmanned aerial vehicle 110, or capabilities of unmanned aerial vehicle 110. In some illustrative examples, weather conditions 178 are received from weather reports (not depicted). In some illustrative examples, a set value for specified distance 158 is part of flight plan 150.

Specified distance 158 may be selected based on any desirable characteristics. In some illustrative examples, specified distance 158 is selected based on weather conditions 178. For example, specified distance 158 is greater when weather conditions 178 include strong winds. Strong winds may push unmanned aerial vehicle 110 towards high voltage power line 146. Specified distance 158 is increased to compensate for strong winds. As another example, specified distance 158 may be greater when weather conditions 178 include thunderstorms. Thunderstorms may include static electricity and naturally occurring electromagnetic fields. Field strength sensor 136 may detect the naturally occurring electromagnetic fields in addition to electromagnetic field 152. Specified distance 158 may be increased to take into account the possible static electricity and naturally occurring electromagnetic fields of the thunderstorm.

In some illustrative examples, specified distance 158 is a maximum length from high voltage power line 146 while maintaining a pre-defined value for efficiency 126 of recharging system 120 of unmanned aerial vehicle 110. In some illustrative examples, the pre-defined value for efficiency 126 is a maximum efficiency under current conditions in regions 108. A maximum value for efficiency 126 is situationally and hardware dependent. For example, efficiency 126 is affected by field strength 176 of high voltage power line 146, an ambient temperature, and charging settings for rechargeable battery 114.

In some illustrative examples, specified distance 158 is selected to maintain a charge level of rechargeable battery 114. In some illustrative examples, specified distance 158 is selected based on field strength 176.

In some illustrative examples, specified distance 158 is part of flight plan 150 created by flight plan generator 148. In other illustrative examples, specified distance 158 is determined by controller 180 of unmanned aerial vehicle 110. Controller 180 is configured to fly unmanned aerial vehicle 110. In some illustrative examples, controller 180 is configured to fly the unmanned aerial vehicle 110 such that inductor 116 charges rechargeable battery 114 using electromagnetic field 152 of high voltage power line 146 while flying unmanned aerial vehicle 110 specified distance 158 from high voltage power line 146.

The illustration of environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, more than one type of impact prevention sensor 118 may be present on unmanned aerial vehicle 110. In some illustrative examples, field strength sensor 136 as well as at least one of SONAR sensor 130, RADAR sensor 132, or optical sensor 134 are present on unmanned aerial vehicle 110. In some illustrative examples, recharging system 120 is used as a field strength sensor.

Although only unmanned aerial vehicle 110 is depicted in region 108, in other illustrative examples, additional unmanned aerial vehicles may operate within region 108. In some illustrative examples, another unmanned aerial vehicle may travel a set distance from high voltage power line 146. In these illustrative examples, impact prevention sensor 118 and a respective impact prevention sensor of the additional unmanned aerial vehicle prevent undesirable contact of unmanned aerial vehicle 110 and the additional unmanned aerial vehicle.

In some illustrative examples, flight plan 150 is filed with a reporting service. By filing flight plan 150, flight plans for additional unmanned aerial vehicles may be created to avoid undesirable contact with unmanned aerial vehicle 110.

Figure 2:
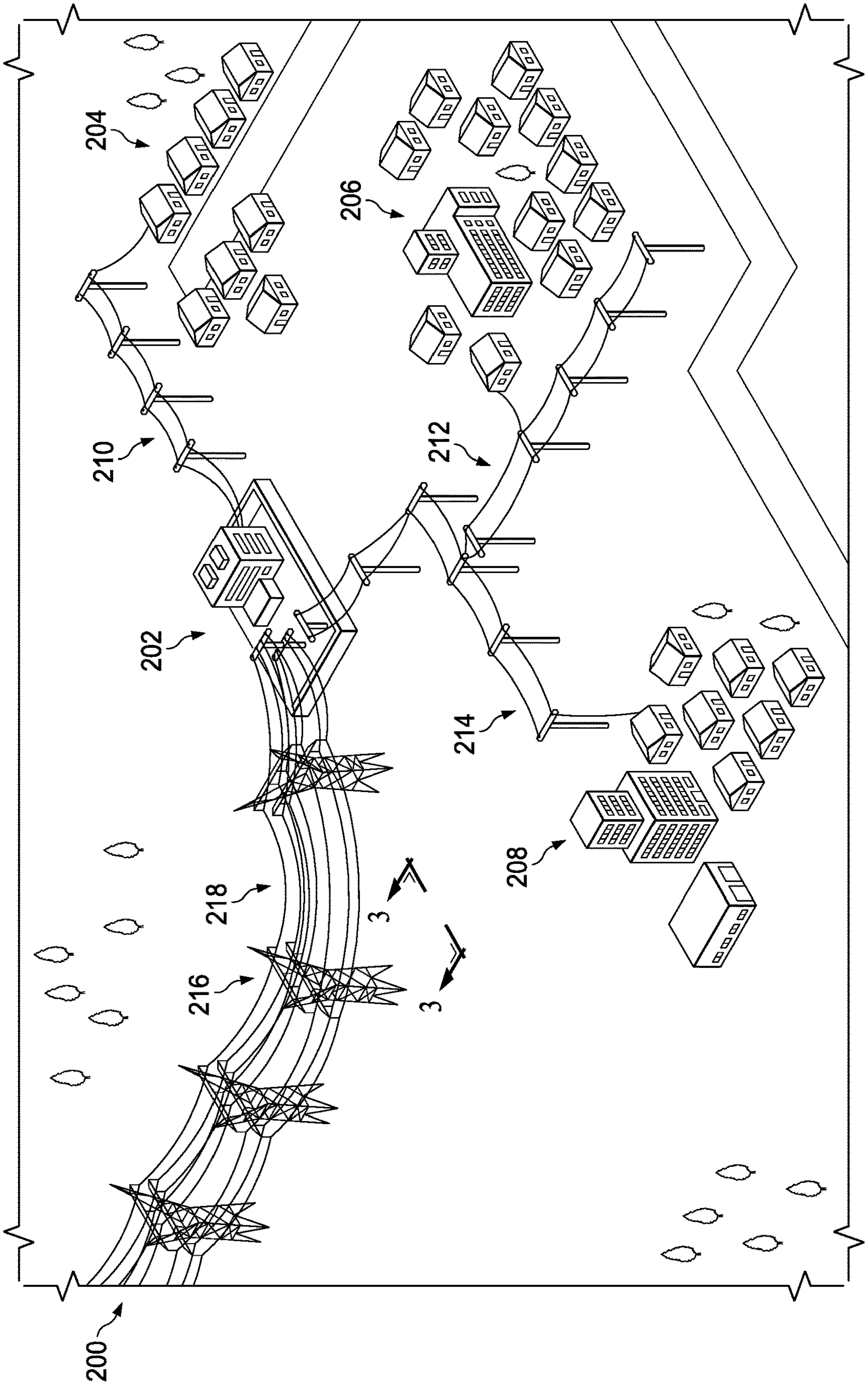
FIG. 2 is an illustration of a region with a high voltage power line in accordance with an illustrative embodiment.

Turning now to FIG. 2, an illustration of a region with a high voltage power line is depicted in accordance with an illustrative embodiment. Region 200 is a physical implementation of region 108 of FIG. 1. In region 200, power plant 202 generates electricity that is distributed to neighborhood 204, neighborhood 206, and neighborhood 208 through distribution lines 210, distribution lines 212, and distribution lines 214 respectively. Region 200 includes transmission line 216. Transmission line 216 is high voltage power line 218. High voltage power line 218 is a physical implementation of high voltage power line 146 of FIG. 1.

High voltage power line 218 has an electromagnetic force (EMF) of sufficient strength to charge an unmanned aerial vehicle. In some illustrative examples, an unmanned aerial vehicle charges a rechargeable battery while flying a specified distance from high voltage power line 218. In some illustrative examples, an unmanned aerial vehicle charges a rechargeable battery while flying at least a specified distance from high voltage power line 218.

The illustration of region 200 in FIG. 2 is not meant to imply physical or architectural limitations to the manner in which an illustrative embodiment may be implemented. For example, although high voltage power line 218 are depicted above ground, in some illustrative examples, high voltage power lines are underground. For example, in a rural environment, underground utilities or pipelines are buried in the same easements as high voltage powerlines. In these examples, an unmanned aerial vehicle may monitor the utilities or pipelines while recharging using the high voltage power lines.

Figure 3:
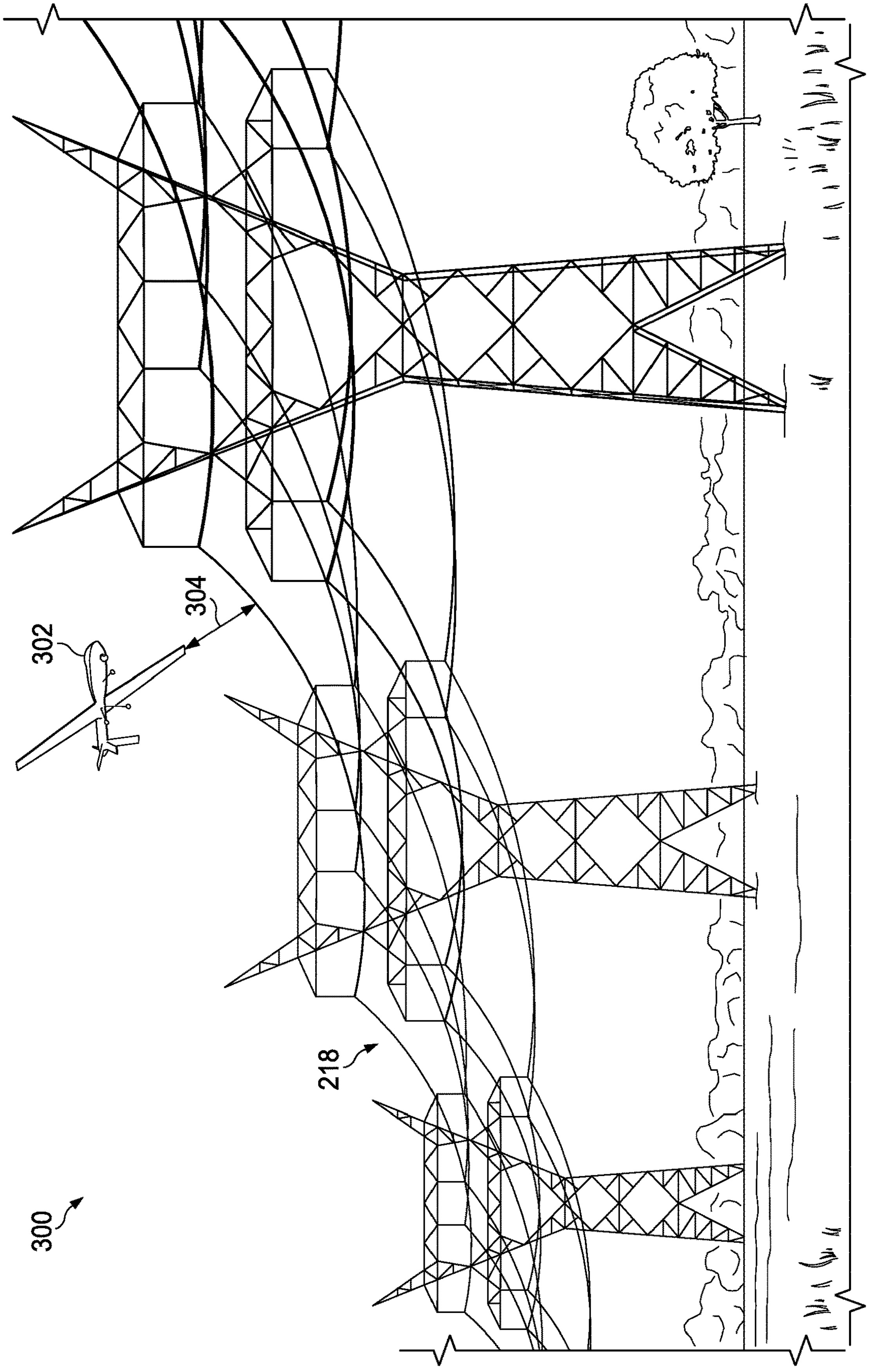
FIG. 3 is an illustration of an unmanned aerial vehicle flying in a region with a high voltage power line in accordance with an illustrative embodiment.

Turning now to FIG. 3, an illustration of an unmanned aerial vehicle flying in a region with a high voltage power line is depicted in accordance with an illustrative embodiment. View 300 is a view along direction 3 in FIG. 2. In view 300, unmanned aerial vehicle 302 is flying distance 304 from high voltage power line 218. Unmanned aerial vehicle 302 is a physical implementation of unmanned aerial vehicle 110 of FIG. 1.

In some illustrative examples, distance 304 is a physical implementation of specified distance 158 of FIG. 1. In some illustrative examples, distance 304 is up to 200 meters. Distance 304 is selected based upon any desirable characteristics. In some illustrative examples, distance 304 is selected such that distance 304 is a maximum length for unmanned aerial vehicle 302 to have a pre-defined value for recharging efficiency. In some illustrative examples, distance 304 is selected based on weather information for region 200 of FIG. 2. In some illustrative examples, distance 304 is selected based on the capabilities of unmanned aerial vehicle 302. In some illustrative examples, distance 304 is selected to maintain a set amount of power in a rechargeable battery of unmanned aerial vehicle 302.

The illustration of view 300 in FIG. 3 is not meant to imply physical or architectural limitations to the manner in which an illustrative embodiment may be implemented. For example, unmanned aerial vehicle 302 is depicted as a fixed wing aircraft. However, in other illustrative examples, an unmanned aerial vehicle may be a rotary unmanned aerial vehicle.

Figure 4:
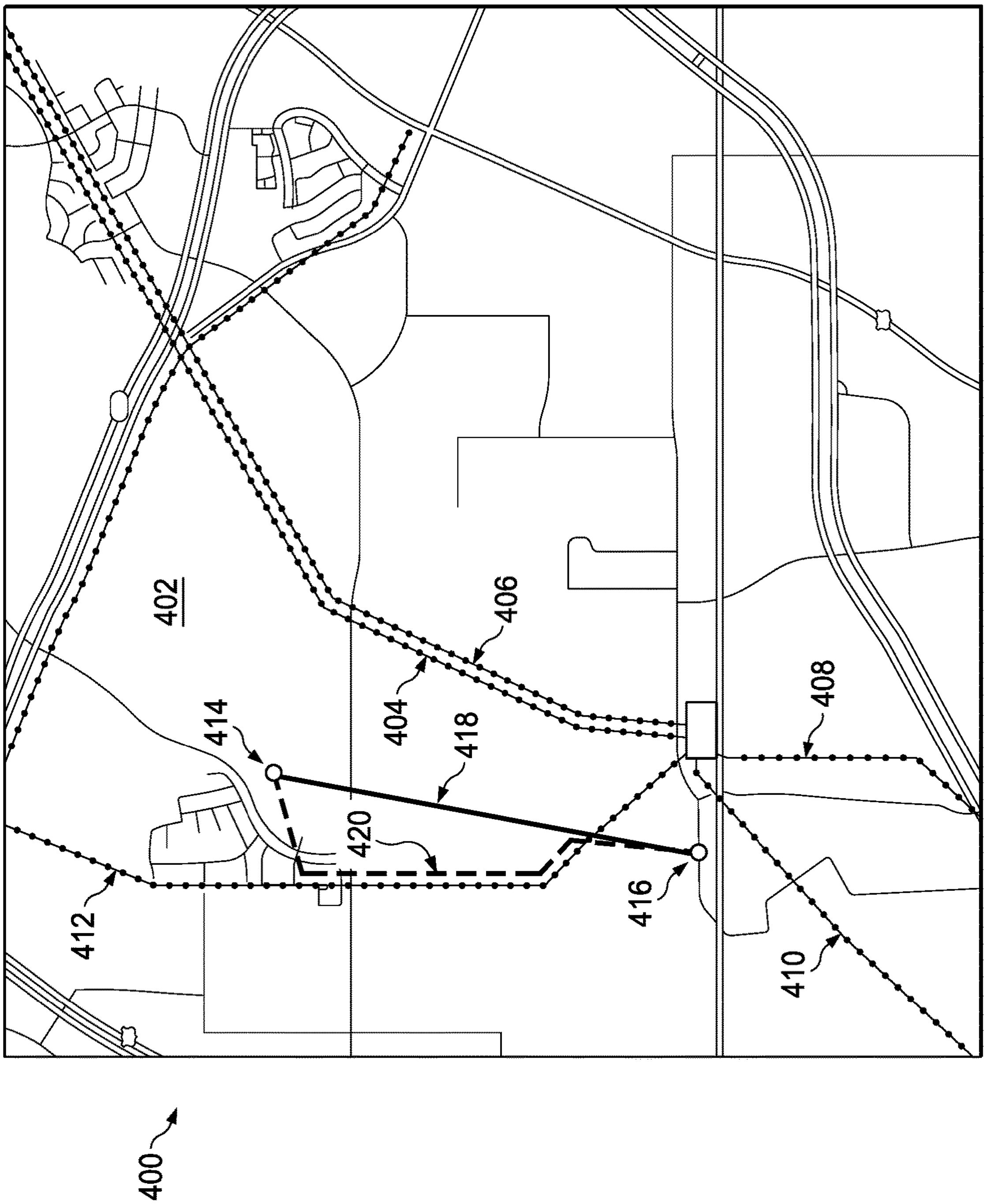
FIG. 4 is an illustration of a map of a region with high voltage power lines in accordance with an illustrative embodiment.

Turning now to FIG. 4, an illustration of a map of a region with high voltage power lines is depicted in accordance with an illustrative embodiment. Map 400 is a physical implementation of high voltage map 160 of FIG. 1.

In map 400, region 402 has high voltage power line 404, high voltage power line 406, high voltage power line 408, high voltage power line 410, and high voltage power line 412. An unmanned aerial vehicle, such as unmanned aerial vehicle 110 of FIG. 1, may fly within region 402.

As depicted, map 400 has departure point 414 for an unmanned aerial vehicle and arrival point 416. Flight plan 418 is a shortest path for an unmanned aerial vehicle traveling from departure point 414 to arrival point 416.

In some illustrative examples, flight plan 420 is created to charge a rechargeable battery of an unmanned aerial vehicle. Flight plan 420 also meets an objective or a destination for an unmanned aerial vehicle. In this illustrative example, flight plan 420 meets a destination, arrival point 416. Flight plan 420 is an alternative to flight plan 418. Flight plan 420 flies an unmanned aerial vehicle a specified distance from high voltage power line 412. Although flight plan 420 is longer than flight plan 418, in some illustrative examples, a rechargeable battery of the unmanned aerial vehicle may have a greater charge after taking flight plan 420.

The different components shown in FIGS. 2-4 may be combined with components in FIG. 1, used with components in FIG. 1, or a combination of the two. Additionally, some of the components in FIGS. 2-4 may be illustrative examples of how components shown in block form in FIG. 1 can be implemented as physical structures.

Figure 5:
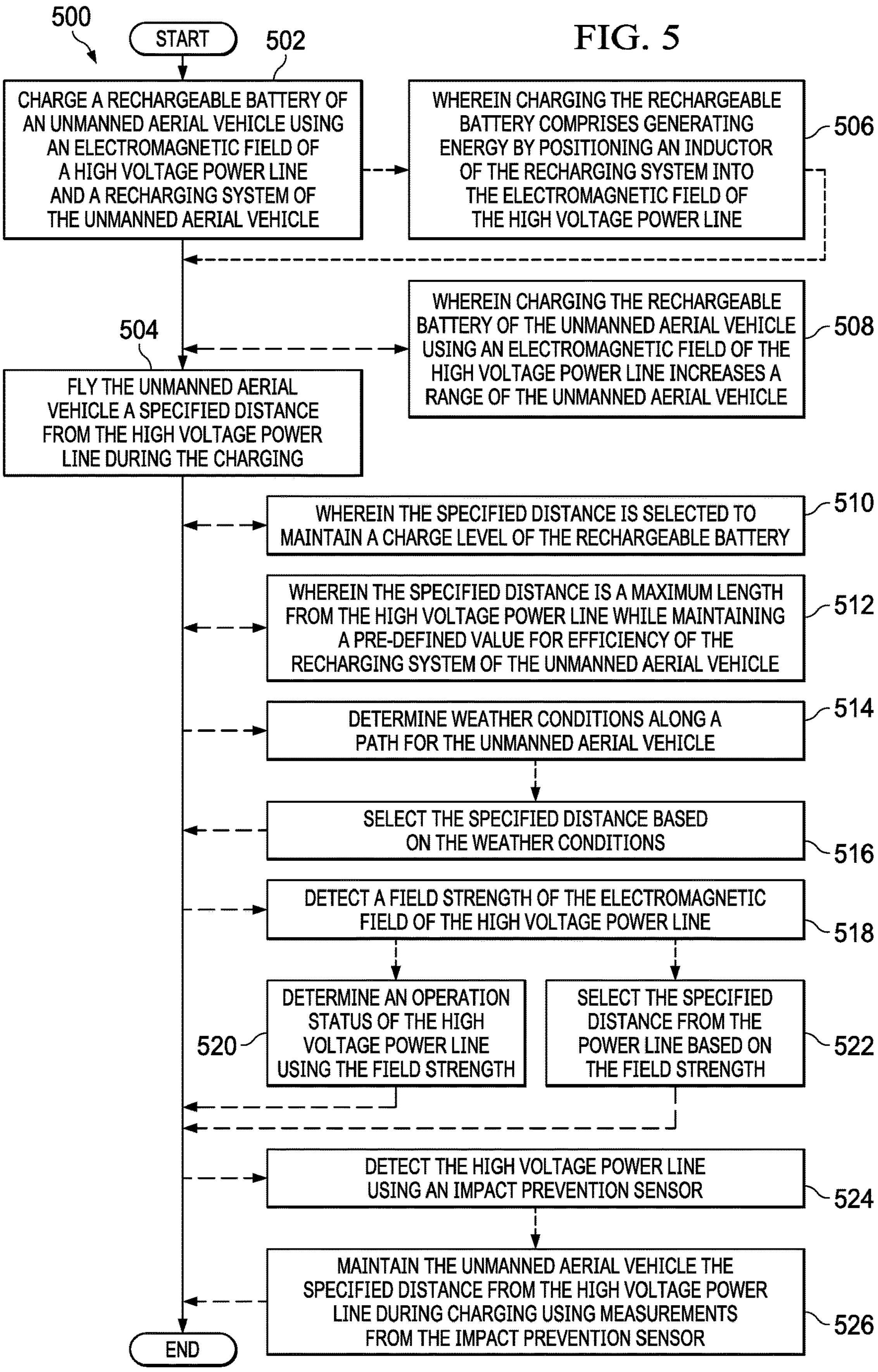
FIG. 5 is an illustration of a flowchart of a method for flying an unmanned aerial vehicle in a region in accordance with an illustrative embodiment.

Turning now to FIG. 5, an illustration of a flowchart of a method for flying an unmanned aerial vehicle in a region is depicted in accordance with an illustrative embodiment. Method 500 may be implemented in environment 100 of FIG. 1. Method 500 may be performed in region 200 of FIGS. 2-3. Method 500 may be performed in region 402 of FIG. 4.

Method 500 charges a rechargeable battery of an unmanned aerial vehicle using an electromagnetic field of a high voltage power line and a recharging system of the unmanned aerial vehicle (operation 502). Method 500 flies the unmanned aerial vehicle a specified distance from the high voltage power line during the charging (operation 504). Afterwards the method terminates.

Several optional operations are also depicted in FIG. 5. In some illustrative examples, charging the rechargeable battery comprises generating energy by positioning an inductor of the recharging system into the electromagnetic field of the high voltage power line (operation 506). In some illustrative examples, charging the rechargeable battery of the unmanned aerial vehicle using an electromagnetic field of the high voltage power line increases a range of the unmanned aerial vehicle (operation 508).

In some illustrative examples, the specified distance is selected to maintain a charge level of the rechargeable battery (operation 510). In some illustrative examples, the specified distance is a maximum length from the high voltage power line while maintaining a pre-defined value for efficiency of the recharging system of the unmanned aerial vehicle (operation 512). In some illustrative examples, the pre-defined value for efficiency is a maximum value for efficiency. The efficiency of the recharging system is affected by a field strength of the high voltage power line, an ambient temperature, and charging settings for the rechargeable battery.

In some illustrative examples, method 500 determines weather conditions along a path for the unmanned aerial vehicle (operation 514). In some illustrative examples, method 500 selects the specified distance based on the weather conditions (operation 516). For example, the specified distance may be selected based on wind conditions. In some illustrative examples, the specified distance may be greater when wind conditions are greater.

In some illustrative examples, method 500 detects a field strength of the electromagnetic field of the high voltage power line (operation 518). In some illustrative examples, method 500 determines an operation status of the high voltage power line using the field strength (operation 520). For example, when the field strength is significantly lower than expected, the high voltage power line may be partially operational or non-operational. In some illustrative examples, when the field strength is significantly lower than expected, the unmanned aerial vehicle may send communications requesting additional inspection or maintenance for the high voltage power line. In some illustrative examples, when the field strength is significantly lower than expected and when the unmanned aerial vehicle has an attached camera, pictures of the high voltage power line may be taken in response to lower than expected field strength.

In some illustrative examples, method 500 selects the specified distance from the power lines based on the field strength (operation 522). For example, the specified distance may be greater when the field strength is greater.

In some illustrative examples, method 500 detects the high voltage power line using an impact prevention sensor (operation 524). In some illustrative examples, method 500 maintains the unmanned aerial vehicle the specified distance from the high voltage power line during charging using measurements from the impact prevention sensor (operation 526). In some illustrative examples, the impact prevention sensor is one of a SONAR sensor, a RADAR sensor, an optical sensor, or a field strength sensor.

Figure 6:
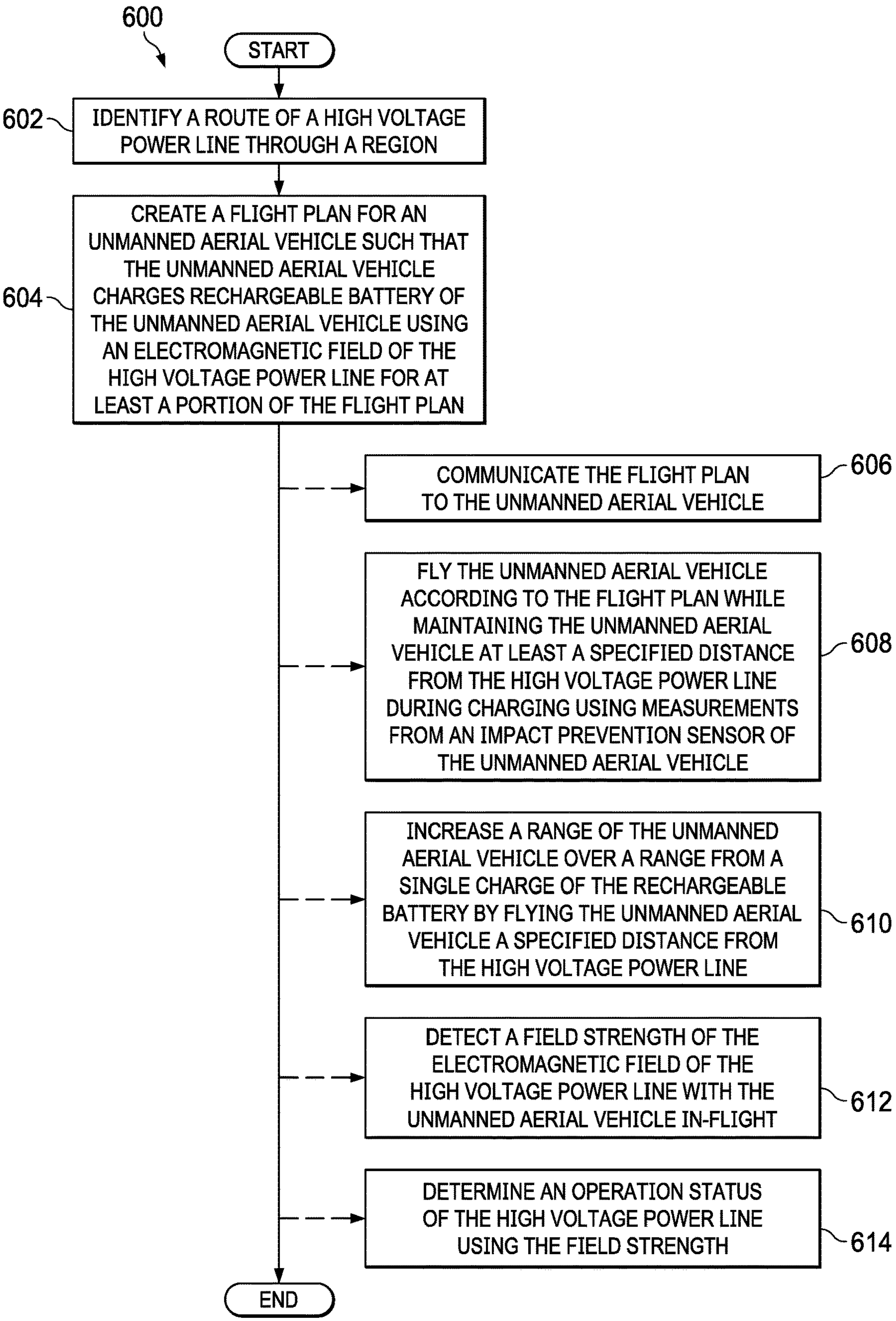
FIG. 6 is an illustration of a flowchart of a method for creating a flight plan for an unmanned aerial vehicle in a region in accordance with an illustrative embodiment.

Turning now to FIG. 6, an illustration of a flowchart of a method for creating a flight plan for an unmanned aerial vehicle in a region is depicted in accordance with an illustrative embodiment. Method 600 may be implemented in environment 100 of FIG. 1. Method 600 may be performed using high voltage map 160 of FIG. 1. A flight plan generated by method 600 may be flown within region 200 of FIGS. 2-3. Method 600 may be performed using a map such as map 400 of FIG. 4.

Method 600 identifies a route of a high voltage power line through a region (operation 602). Method 600 creates a flight plan for an unmanned aerial vehicle such that the unmanned aerial vehicle charges rechargeable battery of the unmanned aerial vehicle using an electromagnetic field of the high voltage power line for at least a portion of the flight plan (operation 604).

Several optional operations are also depicted in FIG. 6. In some illustrative examples, method 600 communicates the flight plan to the unmanned aerial vehicle (operation 606). In some illustrative examples, method 600 flies the unmanned aerial vehicle according to the flight plan while maintaining the unmanned aerial vehicle at least a specified distance from the high voltage power line during charging using measurements from an impact prevention sensor of the unmanned aerial vehicle (operation 608).

In some illustrative examples, method 600 increases a range of the unmanned aerial vehicle over a range from a single charge of the rechargeable battery by flying the unmanned aerial vehicle at least a specified distance from the high voltage power line (operation 610). In some illustrative examples, method 600 detects a field strength of the electromagnetic field of the high voltage power line with the unmanned aerial vehicle in-flight (operation 612).

In some illustrative examples, method 600 determines an operation status of the high voltage power line using the field strength (operation 614). For example, when the field strength is significantly lower than expected, the high voltage power line may be partially operational or non-operational. In some illustrative examples, when the field strength is significantly lower than expected, the unmanned aerial vehicle may send communications requesting additional inspection or maintenance for the high voltage power line. In some illustrative examples, when the field strength is significantly lower than expected and when the unmanned aerial vehicle has an attached camera, pictures of the high voltage power line may be taken in response to lower than expected field strength.

Figure 7:
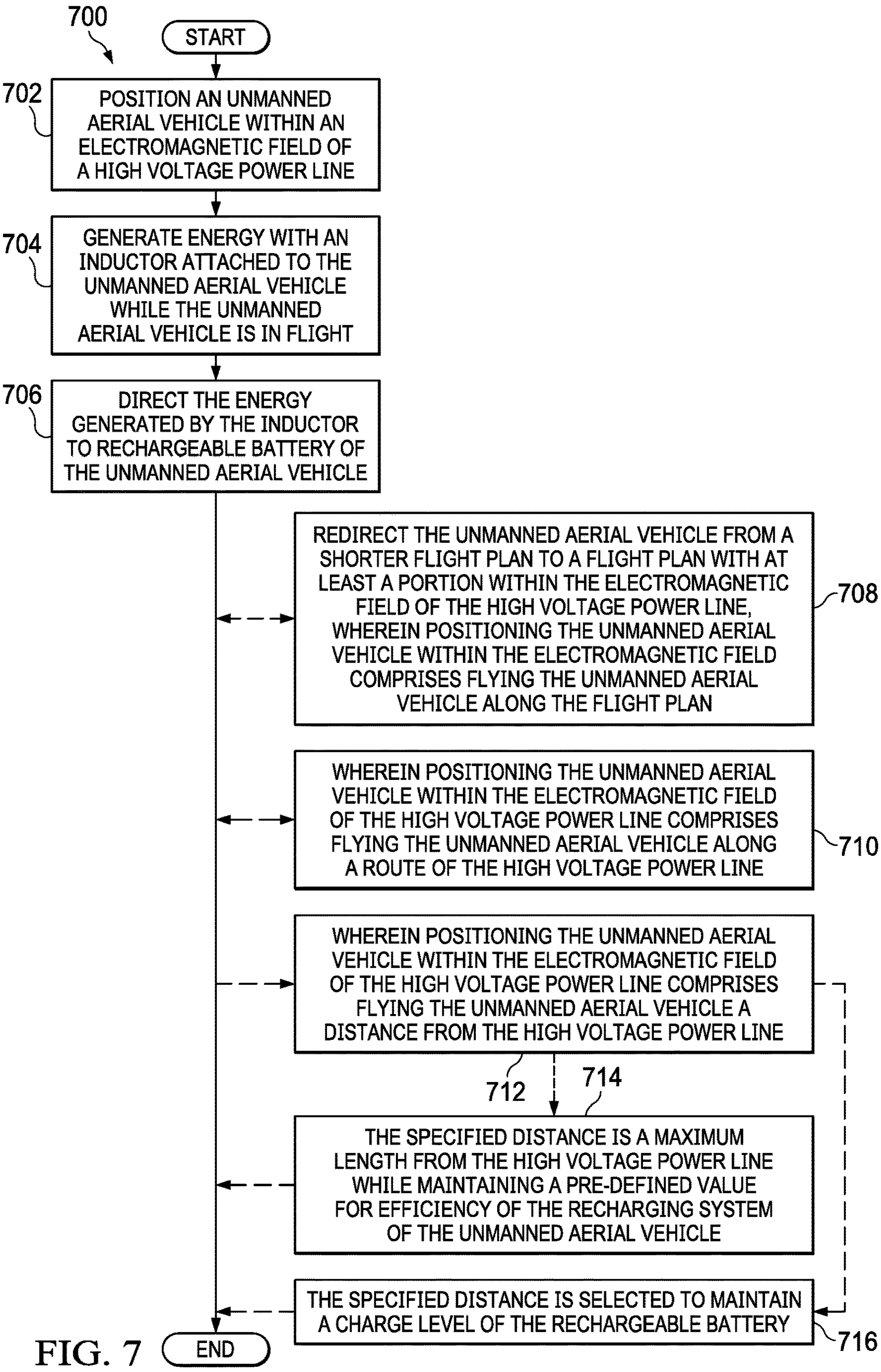
FIG. 7 is an illustration of a flowchart of a method for flying an unmanned aerial vehicle in a region in accordance with an illustrative embodiment.

Turning now to FIG. 7, an illustration of a flowchart of a method for flying an unmanned aerial vehicle in a region is depicted in accordance with an illustrative embodiment. Method 700 may be implemented using unmanned aerial vehicle 110 of FIG. 1. Method 700 may be performed in region 200 of FIGS. 2-3 using unmanned aerial vehicle 302. Method 700 may be performed in region 402 of FIG. 4.

Method 700 positions an unmanned aerial vehicle within an electromagnetic field of a high voltage power line (operation 702). Method 700 generates energy with an inductor attached to the unmanned aerial vehicle while the unmanned aerial vehicle is in flight (operation 704). Method 700 directs the energy generated by the inductor to rechargeable battery of the unmanned aerial vehicle (operation 706). Afterwards, the method terminates.

Several optional operations are also depicted in FIG. 7. In some illustrative examples, method 700 redirects the unmanned aerial vehicle from a shortest flight plan to a flight plan with at least a portion within an electromagnetic field of the high voltage power line, wherein positioning the unmanned aerial vehicle within the electromagnetic field comprises flying the unmanned aerial vehicle along the flight plan (operation 708).

In some illustrative examples, the flight plan takes into account supporting structures of the high voltage power line. In some illustrative examples, the flight plan directs the unmanned aerial vehicle around towers holding up the high voltage power line. In some illustrative examples, the flight plan is at least partially parallel to the high voltage power line. In other illustrative examples, the flight plan is within the electromagnetic field of the high voltage power line, but not parallel to the high voltage power line. In some illustrative examples, the flight plan has a non-parallel pattern such as a corkscrew within the electromagnetic field of the high voltage power line.

In some illustrative examples for method 700, positioning the unmanned aerial vehicle within the electromagnetic field of the high voltage power line comprises flying the unmanned aerial vehicle along a route of the high voltage power line (operation 710). In some illustrative examples for method 700, positioning the unmanned aerial vehicle within the electromagnetic field of the high voltage power line comprises flying the unmanned aerial vehicle a specified distance from the high voltage power line (operation 712). In some illustrative examples, the specified distance is a maximum length from the high voltage power line while maintaining a pre-defined value for efficiency of the recharging system of the unmanned aerial vehicle (operation 714). In some illustrative examples, the specified distance is selected to maintain a charge level of the rechargeable battery (operation 716).

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or a block diagram.

In some illustrative examples, not all blocks of method 500, method 600, and method 700 are performed. For example, each of method 500, method 600, and method 700 have optional steps described.

The illustrative examples allow for recharging of unmanned aerial vehicles (UAVs) while flying by using the Electro Magnetic Field (EMF) that radiates from high power lines to generate a charging current on through use of an inductor (coil) and charging circuitry on board the UAV. Whereas normally UAVs avoid flying near high voltage power lines due to collision potential, if equipped with a map and sensors as in the illustrative examples, UAVs can avoid colliding with the power lines or towers. Thus, a UAV can fly near enough to a power line to recharge its batteries via an inductor and charging circuitry, while staying at a reasonably safe distance from the towers. In these illustrative examples, recharging using an EMF may be used by any type of unmanned aerial vehicles, including rotary UAVs or fixed wing UAVs.

In some of the illustrative examples, a flight planning system optimizes flight plans to enable UAVs to fly along power lines for part of their routes of flight to recharge or extend their flights. In some illustrative examples, a guidance system of a UAV may use a voltage reading to further gauge distance to the power lines in addition to a map of power line towers. Further, the UAV could be programmed to loiter around a specified area of power lines until recharged. For example, a UAV may hover near a power line to recharge. In some illustrative examples, a flight plan (otherwise known as a flight path) is plotted along the power lines to facilitate long distance routes.

This would enable a UAV to fly along the power line, taking charge to extend its useful range while monitoring both the power line and underground pipeline to check for leaks, damage, or sabotage. The UAV could even detect voltage transformer issues when a power line fails to provide a strong enough electrical field to facilitate recharging in-flight. By using high voltage power lines and an inductor, charging power can be obtained at a safe distance.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:

charging a rechargeable battery of an unmanned aerial vehicle using an electromagnetic field of a high voltage power line and a recharging system of the unmanned aerial vehicle; and flying the unmanned aerial vehicle a specified distance from the high voltage power line during the charging, wherein the specified distance is a maximum length from the high voltage power line while maintaining a predefined value for efficiency of the recharging system of the unmanned aerial vehicle, and wherein the predefined value for efficiency is a maximum value for efficiency.

2. The method of claim 1, wherein charging the rechargeable battery of the unmanned aerial vehicle uses a flight plan of a flight plan generator that is connected to the recharging system.

3. The method of claim 1, wherein the specified distance is selected based on at least one of weather conditions and field strength.

4. The method of claim 1, wherein charging the rechargeable battery comprises generating energy by positioning an inductor of the recharging system into the electromagnetic field of the high voltage power line.

5. The method of claim 1 further comprising:

determining weather conditions along a path for the unmanned aerial vehicle using a database; and selecting the specified distance based on the weather conditions.

6. The method of claim 1 further comprising:

detecting a field strength of the electromagnetic field of the high voltage power line; and determining an operation status of the high voltage power line using the field strength.

7. The method of claim 1 further comprising:

detecting a field strength of the electromagnetic field of the high voltage power line; and selecting the specified distance from the high voltage power line based on the field strength.

8. The method of claim 1 further comprising:

detecting the high voltage power line using an impact prevention sensor; and maintaining the unmanned aerial vehicle the specified distance from the high voltage power line during charging using measurements from the impact prevention sensor.

9. The method of claim 8, wherein the impact prevention sensor is one of a SONAR sensor, a RADAR sensor, an optical sensor, or a field strength sensor.

10. The method of claim 1, wherein charging the rechargeable battery of the unmanned aerial vehicle using an electromagnetic field of the high voltage power line increases a range of the unmanned aerial vehicle.

11. A method comprising:

charging a rechargeable battery of an unmanned aerial vehicle using an electromagnetic field of a high voltage power line and a recharging system of the unmanned aerial vehicle; and flying the unmanned aerial vehicle a specified distance from the high voltage power line during the charging, wherein the specified distance is a maximum length from the high voltage power line while maintaining a predefined value for efficiency of the recharging system of the unmanned aerial vehicle, and wherein the predefined value for efficiency is a maximum value for efficiency and based on at least one of weather conditions and field strength.

12. The method of claim 11, wherein charging the rechargeable battery of the unmanned aerial vehicle uses a flight plan of a flight plan generator that is connected to the recharging system.

13. The method of claim 11, wherein charging the rechargeable battery comprises generating energy by positioning an inductor of the recharging system into the electromagnetic field of the high voltage power line.

14. The method of claim 11 further comprising: determining weather conditions along a path for the unmanned aerial vehicle using a database; and selecting the specified distance based on the weather conditions.

15. The method of claim 11 further comprising: detecting a field strength of the electromagnetic field of the high voltage power line; and determining an operation status of the high voltage power line using the field strength.

16. The method of claim 11 further comprising: detecting a field strength of the electromagnetic field of the high voltage power line; and selecting the specified distance from the high voltage power line based on the field strength.

17. The method of claim 11 further comprising: detecting the high voltage power line using an impact prevention sensor; and maintaining the unmanned aerial vehicle the specified distance from the high voltage power line during charging using measurements from the impact prevention sensor.

18. The method of claim 17, wherein the impact prevention sensor is one of a SONAR sensor, a RADAR sensor, an optical sensor, or a field strength sensor.

19. The method of claim 11, wherein charging the rechargeable battery of the unmanned aerial vehicle using an electromagnetic field of the high voltage power line increases a range of the unmanned aerial vehicle.

20. A method comprising: charging a rechargeable battery of an unmanned aerial vehicle using an electromagnetic field of a high voltage power line and a recharging system of the unmanned aerial vehicle; and flying the unmanned aerial vehicle a specified distance from the high voltage power line during the charging, wherein the specified distance is a maximum length from the high voltage power line while maintaining a predefined value for efficiency of the recharging system of the unmanned aerial vehicle, and wherein the predefined value for efficiency is a maximum value for efficiency and based on at least one of weather conditions and field strength, wherein charging the rechargeable battery of the unmanned aerial vehicle uses a flight plan of a flight plan generator that is connected to the recharging system, wherein charging the rechargeable battery comprises generating energy by positioning an inductor of the recharging system into the electromagnetic field of the high voltage power line, and wherein charging the rechargeable battery of the unmanned aerial vehicle using an electromagnetic field of the high voltage power line increases a range of the unmanned aerial vehicle.

21. The method of claim 20 further comprising: determining weather conditions along a path for the unmanned aerial vehicle using a database; and selecting the specified distance based on the weather conditions.

22. The method of claim 20 further comprising: detecting a field strength of the electromagnetic field of the high voltage power line; and determining an operation status of the high voltage power line using the field strength.

23. The method of claim 20 further comprising: detecting a field strength of the electromagnetic field of the high voltage power line; and selecting the specified distance from the high voltage power line based on the field strength.

* * * * *